United States Patent
Iizuka (10) Patent No.: US 12,479,053 B2
(45) Date of Patent: Nov. 25, 2025

(54) HOLDING TABLE ASSEMBLY AND PROCESSING METHOD

(71) Applicant: DISCO CORPORATION, Tokyo (JP)

(72) Inventor: Kentaro Iizuka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 608 days.

(21) Appl. No.: 18/068,669

(22) Filed: Dec. 20, 2022

(65) Prior Publication Data

US 2023/0201977 A1    Jun. 29, 2023

(30) Foreign Application Priority Data

Dec. 28, 2021 (JP) .................................. 2021-213601

(51) Int. Cl.
*B23K 37/04* (2006.01)
*B23K 26/38* (2014.01)
*B23K 26/402* (2014.01)

(52) U.S. Cl.
CPC .............. *B23K 37/04* (2013.01); *B23K 26/38* (2013.01); *B23K 26/402* (2013.01)

(58) Field of Classification Search
CPC ............ B23K 2101/40; B23K 2103/52; B23K 2103/56; B23K 26/0006; B23K 26/0622; B23K 26/0823; B23K 26/0853; B23K 26/0876; B23K 26/53; B23K 37/0408
USPC ..................................................... 219/121.72
See application file for complete search history.

(56) References Cited

U.S. PATENT DOCUMENTS

| 2018/0021911 A1* | 1/2018 | Miyamoto | ............... B24B 41/06 451/11 |
| 2018/0269068 A1* | 9/2018 | Watanabe | ........... H01L 21/2236 |
| 2019/0061109 A1* | 2/2019 | Takenouchi | ............ B24B 7/241 |
| 2019/0067018 A1* | 2/2019 | Takenouchi | ............ B24B 7/228 |
| 2019/0273010 A1* | 9/2019 | Yamamoto | .......... H01L 21/6836 |
| 2019/0304769 A1* | 10/2019 | Hirata | ................ B23K 26/0622 |
| 2019/0308296 A1* | 10/2019 | Kawana | ................ B24B 37/044 |
| 2020/0013664 A1* | 1/2020 | Yamamoto | ........ H01L 21/68785 |
| 2020/0371005 A1* | 11/2020 | Saito | ...................... G01N 3/068 |

FOREIGN PATENT DOCUMENTS

| JP | 2015032771 A | 2/2015 |
| JP | 2015223589 A | 12/2015 |
| JP | 6457334 B2 * | 1/2019 |

OTHER PUBLICATIONS

English translation of JP-6457334-B2 (Year: 2019).*

* cited by examiner

*Primary Examiner* — Chris Q Liu (74) *Attorney, Agent, or Firm* — Greer Burns & Crain Ltd.

(57) ABSTRACT

A holding table assembly has a base that includes three or more cylinder sections spaced apart at regular intervals in a circumferential direction, a circular recess formed at an upper part thereof, and a flow channel communicating with the cylinder sections and the circular recess. A holding table includes a holding surface inserted into the circular recess of the base that holds an ingot under suction. A circular plate has a plurality of minute holes and insertion holes formed at positions corresponding to each of the cylinder sections and spaced apart at regular intervals in the circumferential direction. Pistons are inserted in the cylinder sections, the number of pistons being equal to the number of cylinder sections, and support pins of which base ends abut against the pistons and tip ends are inserted in the insertion holes.

2 Claims, 7 Drawing Sheets

HOLDING TABLE ASSEMBLY AND PROCESSING METHOD

BACKGROUND OF THE INVENTION

Field of the Invention

The present invention relates to a holding table assembly having a holding surface for holding under suction an ingot, and particularly to a technique for preventing damage to the holding surface.

Description of the Related Art

Conventionally, as disclosed in, for example, Japanese Patent Laid-open No. 2015-032771 and Japanese Patent Laid-open No. 2015-223589, a method of slicing an SiC (silicon carbide) wafer from an SiC ingot by use of a laser processing apparatus in place of a conventionally used wire saw is known. The ingot of a hard material such as SiC is placed and held on a holding surface of a holding table in such a manner that a lower side surface of the ingot faces the holding surface of the holding table, and a laser beam is applied to the ingot from above and concentrated on a predetermined position in the ingot, so that a separating layer serving as a starting point in dividing the ingot into wafers is formed.

With such a laser processing apparatus utilized, a cutting allowance can be reduced, and a processing speed is enhanced, leading to enhanced productivity, as compared to a case of slicing SiC wafers by a wire saw.

SUMMARY OF THE INVENTION

For example, in the case of an SiC ingot having a diameter of 6 inches and a weight of several kilograms and, particularly, formed of a hard material and high in hardness, when an operator places the ingot on the holding table, a corner or the like of the ingot may come in contact with the holding surface of the holding table, and chipping of the holding surface of the holding table may be caused, resulting in damage to the holding surface.

When the holding surface of the holding table has been chipped, the ingot cannot be held horizontally, leading to, for example, a problem that a laser beam cannot be concentrated on a desired position in the ingot and high-accuracy processing cannot be carried out.

Accordingly, it is an object of the present invention to provide a holding table assembly capable of preventing damage to a holding surface of a holding table, and a processing method for an ingot with use of the holding table assembly.

In accordance with an aspect of the present invention, there is provided a holding table assembly including a base that has three or more cylinder sections spaced apart at regular intervals in a circumferential direction, a circular recess formed at an upper part thereof, and a flow channel communicating with the cylinder sections and the circular recess, a holding table that includes a holding surface for holding under suction an ingot, the holding surface being inserted into the circular recess of the base, and a circular plate having a plurality of minute holes and insertion holes formed at positions corresponding to the cylinder sections and spaced apart at regular intervals in the circumferential direction, the number of the insertion holes being equal to the number of the cylinder sections, pistons inserted in the cylinder sections, the number of the pistons being equal to the number of the cylinder sections, support pins of which base ends abut against the pistons and tip ends are inserted in the insertion holes, the number of the support pins being equal to the number of the cylinder sections, an air suction source, an air supply source, and a control valve that selectively connects the air suction source and the air supply source to the flow channel. The flow channel is connected to the air supply source through the control valve, and air is supplied into air pressure chambers defined inside the cylinder sections by the pistons inserted into the cylinder sections, thereby causing the tip ends of the support pins to be positioned at supportable positions projecting from the holding surface in such a manner that the ingot can be supported by the tip ends of the support pins, and the flow channel is connected to the air suction source through the control valve to decompress the air pressure chambers, causing the tip ends of the support pins to be positioned at retracted positions in which the tip ends of the support pins are buried in the insertion holes and causing the ingot to be supported on the holding surface and to be held under suction on the holding surface by a negative pressure acting on the plurality of minute holes.

In accordance with another aspect of the present invention, there is provided a processing method for separating a wafer from an ingot, the processing method including a support pin projecting step of projecting three or more support pins from a holding surface of a holding table, a step of mounting the ingot on tip ends of the support pins and supporting the ingot above the holding surface by the support pins, a holding step of moving the support pins in such a manner that the support pins are buried in the holding surface and mounting the ingot on the holding surface to hold under suction the ingot on the holding surface, and a laser irradiation step of concentrating a laser beam on a predetermined height position of the ingot, and moving the holding table horizontally relative to the laser beam, to form a separating layer in the ingot.

According to the present invention, before holding the ingot on the holding surface, the ingot is mounted on tip ends of a plurality of support pins projecting from the holding surface, the ingot is supported above the holding surface by the support pins, and then, the tip ends of the support pins are gradually positioned at retracted positions in which the tip ends of the support pins are buried in the holding surface, so that the ingot is supported on the holding surface. As a result, in the process to holding of the ingot on the holding table, generation of such a trouble that collision of the ingot against the holding surface or the like may result in damage to the holding surface can be prevented.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
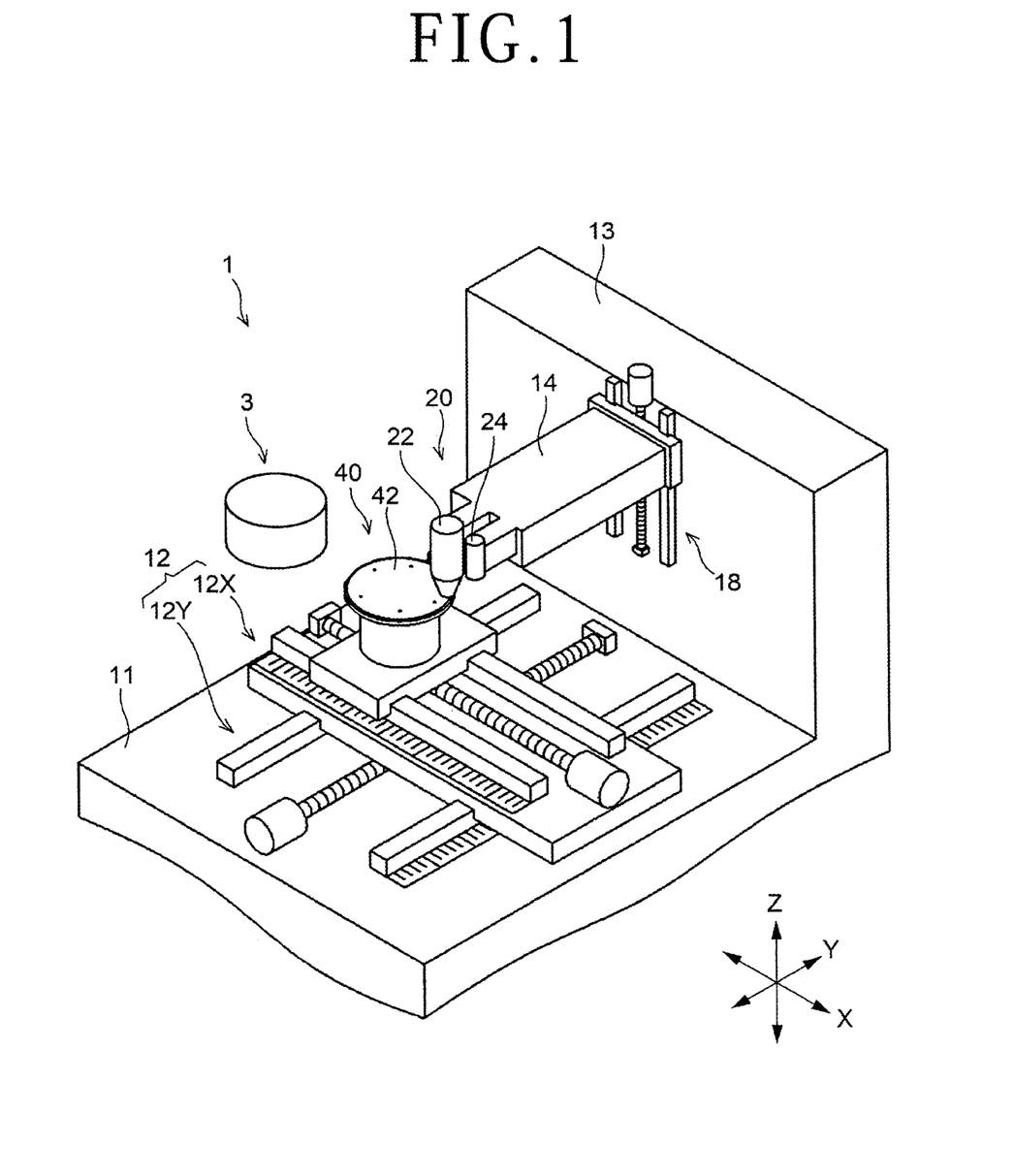
FIG. 1 is a perspective view depicting an example of a laser processing apparatus including a holding table according to an embodiment of the present invention.

FIG. 1 is a perspective view of a laser processing apparatus 1 including a holding table assembly 10 according to an embodiment of the present invention. The laser processing apparatus 1 includes a laser beam irradiation unit 20 for applying a laser beam, and a holding table 40 that holds an ingot 3 on an upper surface thereof.

The laser processing apparatus 1 has a rectangular parallelepiped base 11, and a moving mechanism 12 that puts the holding table 40 into processing feeding in an X-axis direction and puts the holding table 40 into indexing feeding in a Y-axis direction is provided on an upper surface of the base 11.

The moving mechanism 12 has a Y-axis moving mechanism 12Y for relative movement of the holding table 40 in the Y-axis direction relative to the laser beam irradiation unit 20, and an X-axis moving mechanism 12X for relative movement of the holding table 40 in the X-axis direction relative to the laser beam irradiation unit 20.

The holding table 40 is provided to be rotatable (rotation in a θ direction) around a rotational axis extending in a direction perpendicular to a holding surface 42 of the holding table 40. The upper surface of the holding table 40 is connected to an air suction source 52 (FIG. 3A) described in detail later, and is configured as the holding surface 42 that holds under suction the ingot 3.

On the rear side of the moving mechanism 12 on the base 11, a wall section 13 is erected. An arm section 14 projects horizontally from a front surface of the wall section 13, and, on the tip end side of the arm section 14, the laser beam irradiation unit 20 is configured to face the holding table 40.

The laser beam irradiation unit 20 has a processing head 22. Inside the arm section 14 and the processing head 22, an optical system of the laser beam irradiation unit 20 and the like are provided. The optical system of the laser beam irradiation unit 20 includes a laser oscillator that emits a laser beam, a mirror that reflects the laser beam emitted from the laser oscillator, a condenser lens that concentrates the laser beam on the ingot, and the like, and the laser beam is concentrated on a predetermined position in the ingot 3, so that a separating layer serving as a starting point in dividing the ingot into wafers is formed.

The arm section 14 is supported by the wall section 13 through a Z-axis moving mechanism 18, and, along with the movement of the arm section 14 in a Z-axis direction by the Z-axis moving mechanism 18, the processing head 22 disposed at the tip end of the arm section 14 is moved in the Z-axis direction. On a lateral side of the processing head 22, an imaging camera 24 for imaging the surface of the ingot 3 is provided.

In the above-mentioned configuration, for example, in a case where the ingot 3 is an SiC ingot, a laser beam of such a wavelength as to be transmitted through SiC is concentrated on a predetermine height position in the ingot 3, and the holding table 40 is moved horizontally in the X-axis and Y-axis directions relative to the laser beam. As a result, a separating layer in which carbon and silicon are present in a mixed state is formed at the predetermined height position in the ingot 3, and the wafer is divided with the separating layer as a starting point.

Note that the ingot 3 is not limited to the SiC ingot which is harder than the holding surface 42 of the holding table 40 and may be an ingot which is lower in hardness than the holding surface 42 of the holding table 40. For either ingot 3, the present invention is effective in that damaging of the holding surface 42 can be prevented.

Next, the configuration of the holding table 40 depicted in FIGS. 2, 3A, and 3B will be described. The holding table 40 includes a base 41, and a circular plate 43 which is disposed in a circular recess 41c formed in the upper surface of the base 41 to cause the holding surface 42 to be exposed.

The circular plate 43 includes a porous material, and the upper surface thereof constitutes the holding surface 42 that holds under suction the ingot 3. The holding surface 42 is provided with six support pins 44 which are provided in a vertically advanceable and retractable manner to come in contact with a lower surface 3b (FIG. 4) of the ingot 3 and to support the ingot 3 from below.

Figure 2:
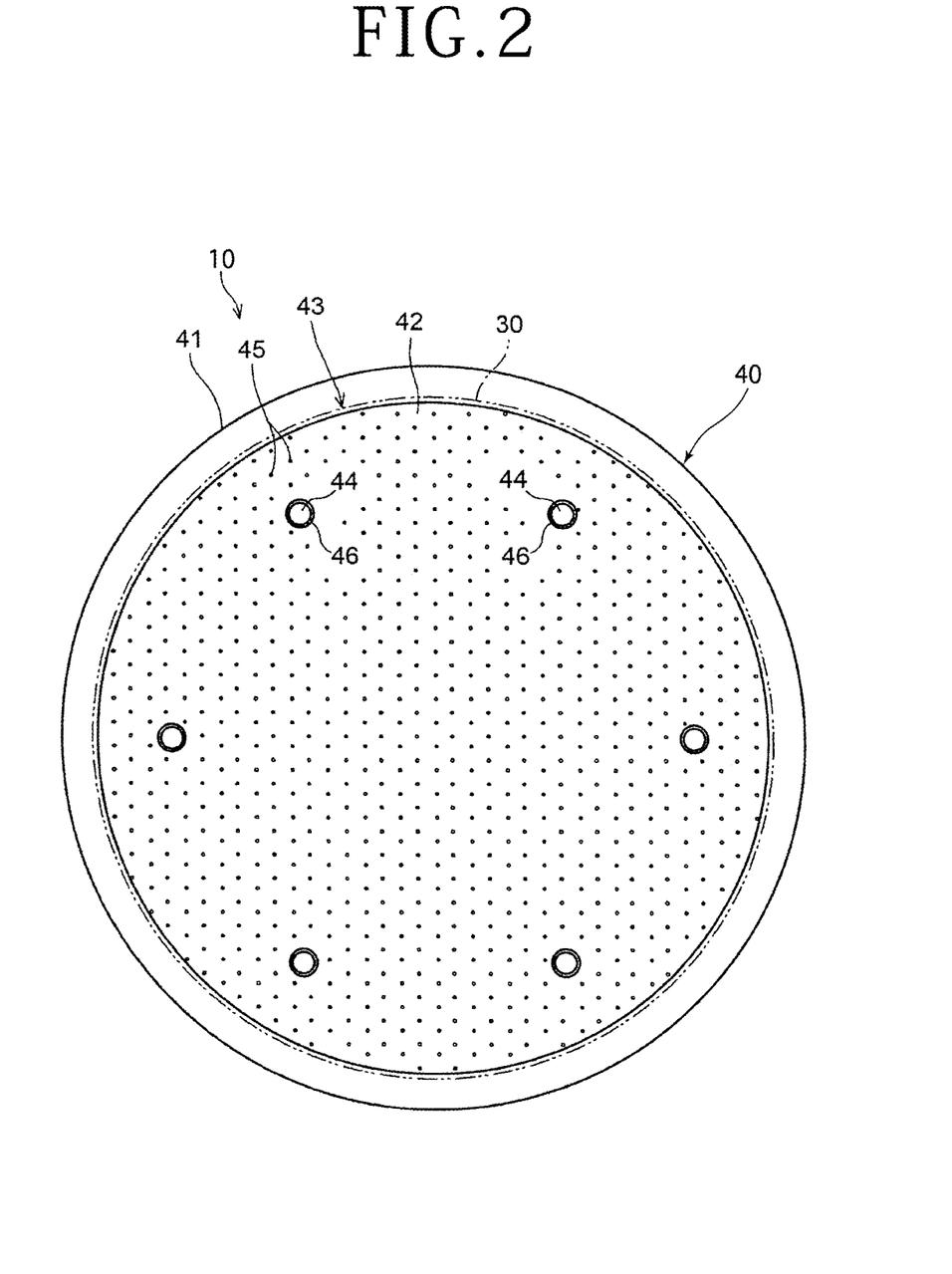
FIG. 2 is a plan view of the holding table of the embodiment of the present invention.

Note that in the present embodiment, as depicted in FIG. 2, the six support pins 44 are arranged at regular intervals in a circumferential pattern such that the ingot 3 can be held stably. However, the number of the support pins 44 is not particularly limited to six, and three or more of the support pins 44 may be sufficient as long as the ingot 3 can be held horizontally.

Figure 3A:
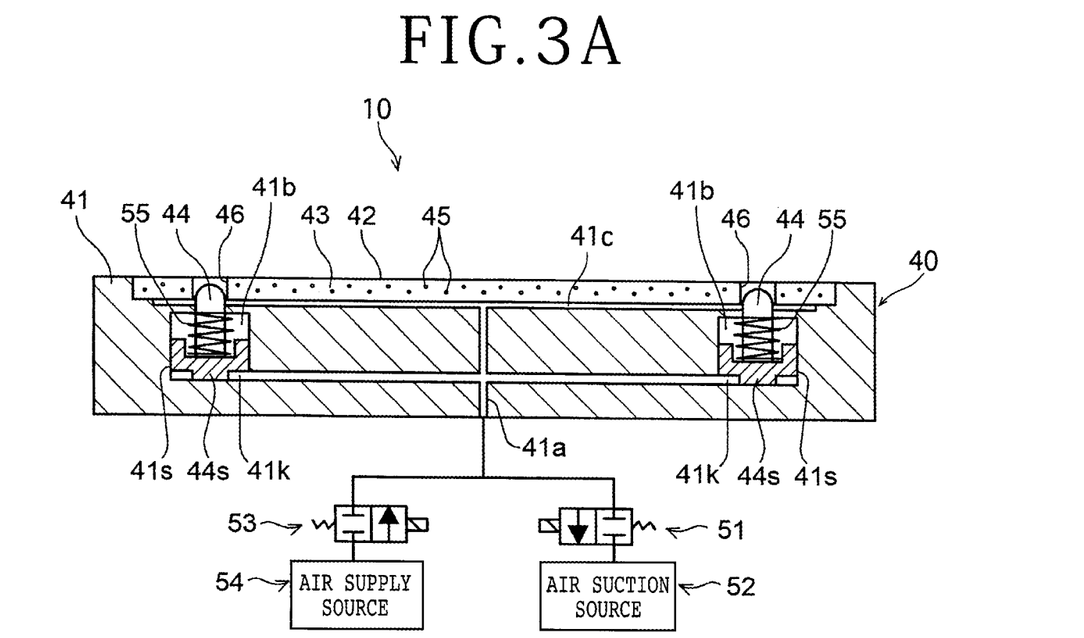
FIG. 3A is a sectional view depicting a state of support pins in a stand-by state.

As depicted in FIGS. 2 and 3A, the holding surface 42 is formed with a plurality of minute holes 45 for sucking the lower surface 3b (FIG. 4) of the ingot 3 and with a plurality of insertion holes 46 in which the respective support pins 44 are inserted.

In the present embodiment, the minute holes 45 are configured by the porous material plate 43 itself, and a negative pressure is generated in the minute holes 45 by suction through a flow channel 41a of the base 41, whereby the holding surface 42 is configured as a surface for holding under suction the ingot 3.

Figure 3B:
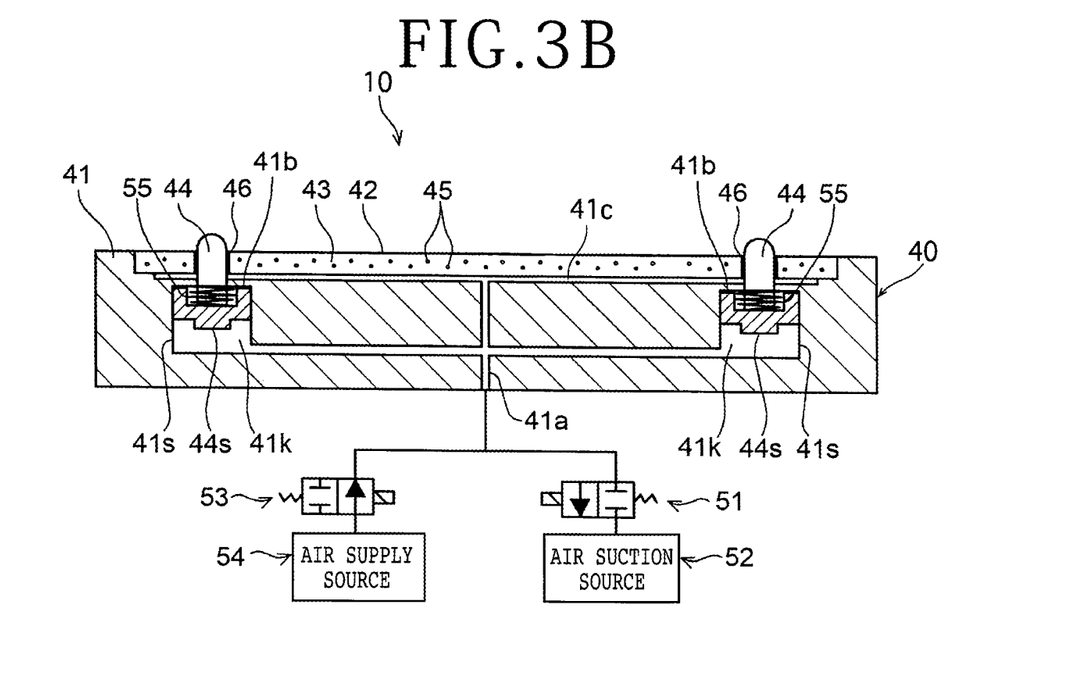
FIG. 3B is a sectional view depicting a state in which the support pins project.

As depicted in FIGS. 3A and 3B, the flow channel 41a is connected to the air suction source 52 through a control valve 51, and, by opening the control valve 51, the holding surface 42 can be made to function as a surface for holding under suction the ingot 3.

The flow channel 41a is also connected to an air supply source 54 through a control valve 53, and, by opening the control valve 53, a positive pressure is generated on the holding surface 42, whereby a buoyant force in a direction in which the ingot 3 is separated from the holding surface 42 can be generated.

The base 41 of the holding table 40 is formed with cylinder sections 41s in which pistons 44s of the support pins 44 are slidably disposed. In the cylinder section 41s, an elastic member 55 abutting against the upper side of the piston 44s of the support pin 44 and biasing the support pin 44 downward is accommodated. The piston 44s is configured to be shaft-like in shape, and the support pin 44 is provided projecting upward from a flat surface on the upper side thereof. The support pin 44 and the piston 44s may be formed as separate bodies, or may be formed as one body.

In the cylinder section 41s, a space on the upper side of the piston 44s is configured as a spring chamber 41b in which the elastic member 55 is accommodated, and a space on the lower side of the piston 44s is configured as an air pressure chamber 41k through which air is supplied and discharged. The elastic member 55 includes, for example, a compression spring that surrounds the periphery of the support pin 44.

Figure 5:
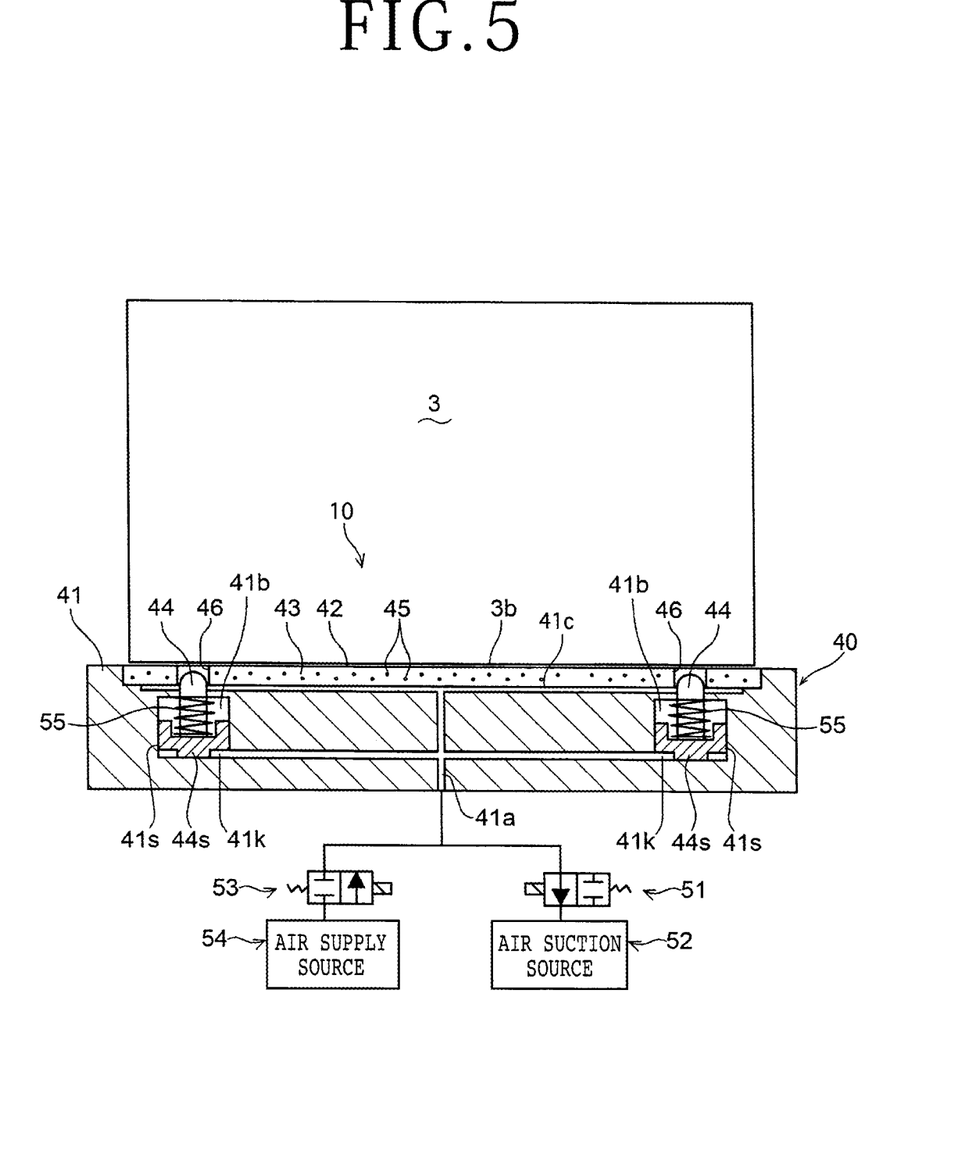
FIG. 5 is a sectional view depicting a state in which the ingot is held under suction by a holding surface of the holding table.

A lower end of the elastic member 55 abuts against an upper part of the piston 44$s$, and biases the support pin 44 in whole downward. In a stand-by state in which the ingot 3 is not supported as depicted in FIG. 3A or when the ingot 3 is held by the holding surface 42 as depicted in FIG. 5, the biasing by the elastic member 55 causes the tip end of the support pin 44 to completely enter the insertion hole 46 but not to project from the holding surface 42.

Note that, in a stand-by state in which the ingot 3 is not supported as depicted in FIG. 3A, the support pin 44 is inserted into the insertion hole 46 by the elastic member 55, thereby achieving a state in which no projection is present on the holding surface 42 and preventing a trouble that the support pin 44 would collide against other members to be damaged or that the support pin 44 would damage other members. In addition, other than the above-mentioned configuration, the elastic member 55 may be omitted, or the elastic member 55 may bias the support pin 44 in a direction in which the support pin 44 projects from the holding surface 42.

A bottom surface on the lower side of the piston 44$s$ faces the air pressure chamber 41$k$ side, and is configured as a pressure-receiving surface for receiving the pressure of air. As depicted in FIG. 3B, the air pressure chamber 41$k$ is connected to the flow channel 41$a$, and, when the control valve 53 is opened to be connected to the air supply source 54, the pressure inside the air pressure chamber 41$k$ is increased, the piston 44$s$ is pushed upward against the biasing force of the elastic member 55, and the tip end of the support pin 44 projects upward from the insertion hole 46.

Figure 4:
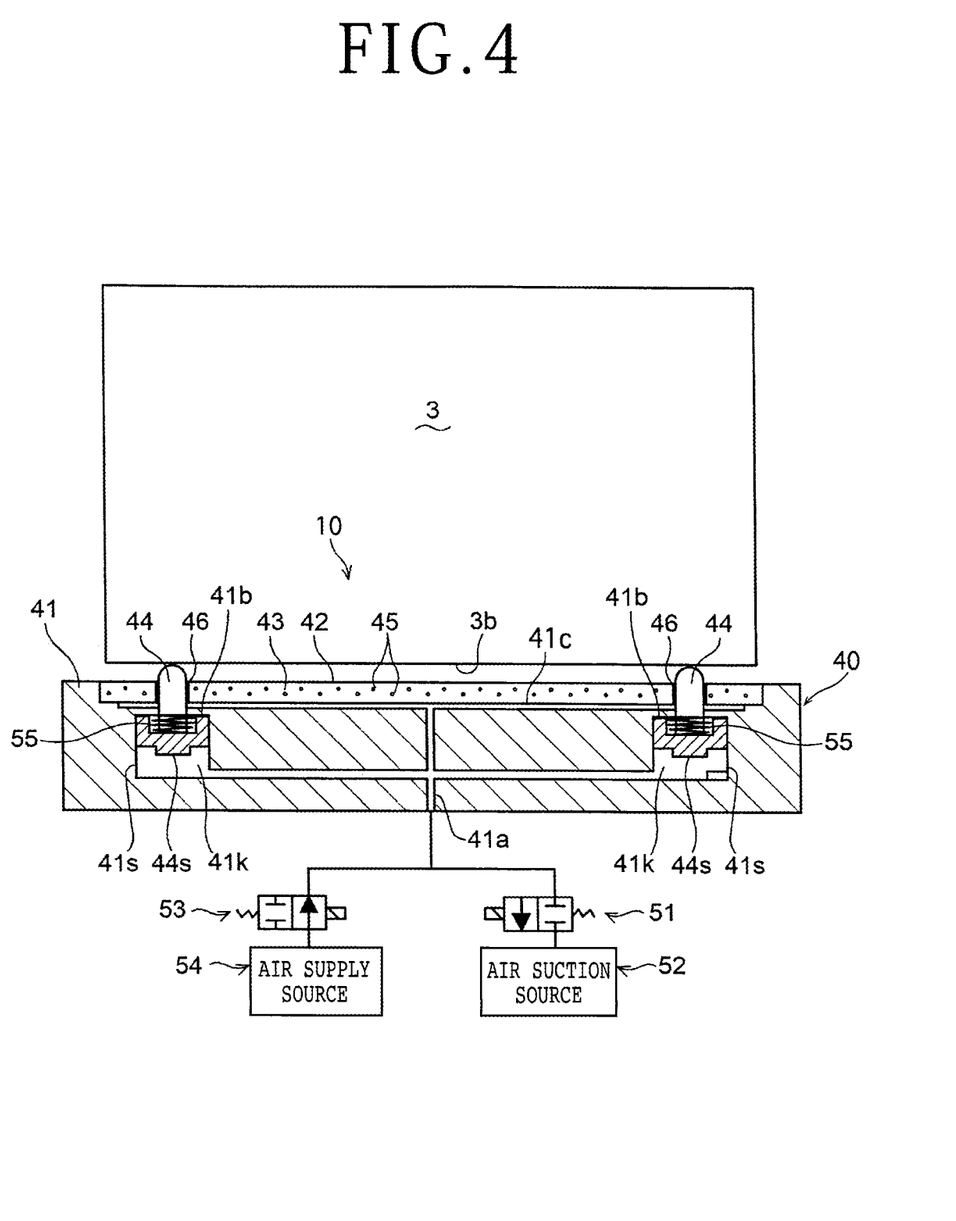
FIG. 4 is a sectional view depicting a state in which an ingot is supported by the support pins.

As depicted in FIGS. 3B and 4, when the ingot 3 is conveyed into the holding table 40, air is supplied into the air pressure chambers 41$k$, causing the tip ends of the support pins 44 to project from the insertion hole 46. As a result, the support pins 44 are positioned at supportable positions in which the tip ends thereof project from the holding surface 42, achieving a state in which the ingot 3 can be supported by the tip ends thereof.

In addition, as depicted in FIG. 3A, the air pressure chambers 41$k$ of the cylinder sections 41$s$ are connected to the flow channel 41$a$. When the control valve 53 is closed and the control valve 51 is opened to connect the air pressure chambers 41$k$ with the air suction source 52, from the state of FIG. 4, the air pressure chambers 41$k$ are decompressed, and, as depicted in FIG. 5, the tip ends of the support pins 44 are gradually positioned at retracted positions in which the tip ends of the support pins 44 are buried in the insertion holes 46 of the holding surface 42, the ingot 3 is lowered, and the lower surface 3$b$ thereof is mounted on the holding surface 42 and held under suction.

Figure 6:
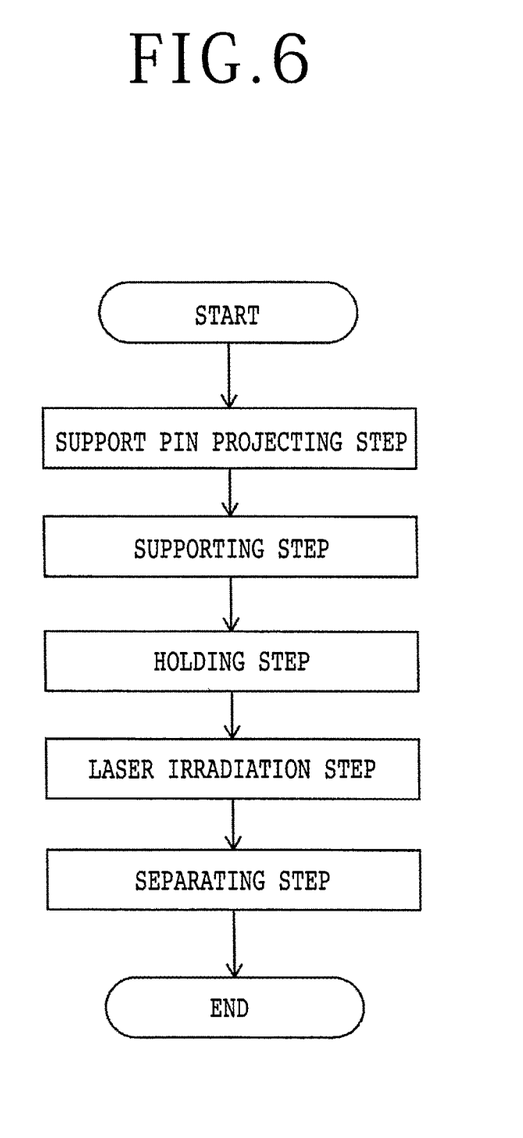
FIG. 6 is a flow chart depicting each step of a processing method.

Next, the processing method of the ingot 3 by use of the holding table and the processing apparatus with the above-mentioned configurations will be described. FIG. 6 is a flow chart concerning the procedure of the processing method for the ingot 3.

<Support Pin Projecting Step>

First, as depicted in FIG. 3B, the control valve 53 is opened, and air is supplied from the air supply source 54 into the air pressure chambers 41$k$, to project the plurality of support pins 44 from the holding surface 42 against biasing forces of the elastic members 55.

<Supporting Step>

Next, as depicted in FIG. 4, the ingot 3 is mounted on the tip ends of the plurality of support pins 44, and the ingot 3 is supported by the support pins 44 above the holding surface 42. Since the tip ends of the support pins 44 project from the holding surface 42, the ingot 3 can be supported by the support pins 44 without being brought into contact with the holding surface 42. As a result, generation of a trouble that collision of the ingot 3 against the holding surface 42 or the like would occur to damage the holding surface 42 can be prevented.

Note that the ingot 3 may be mounted on the tip ends of the support pins 44 by the operator or may be conveyed by a conveying device to be mounted on the tip ends of the support pins 44. In either case, damage to the holding surface 42 by the ingot 3 can be avoided.

<Holding Step>

Subsequently, as depicted in FIG. 5, the control valve 53 is closed to stop the supply of air from the air supply source 54 into the air pressure chambers 41$k$, and the control valve 51 is opened to decompress the air pressure chambers 41$k$ by the air suction source 52. As a result, the tip end of each support pin 44 is gradually drawn into the insertion hole 46, and the lower surface 3$b$ of the ingot 3 is mounted on the holding surface 42.

With the control valve 51 opened, a negative pressure is generated also on the holding surface 42, and the lower surface 3$b$ of the ingot 3 is held under suction on the holding surface 42. Note that, in the above-mentioned embodiment, the two control valves 51 and 53 are used; however, the air suction source 52 and the air supply source 54 may be selectively connected to the flow channel 41$a$ by a single three-position control valve.

<Laser Irradiation Step>

Figure 7:
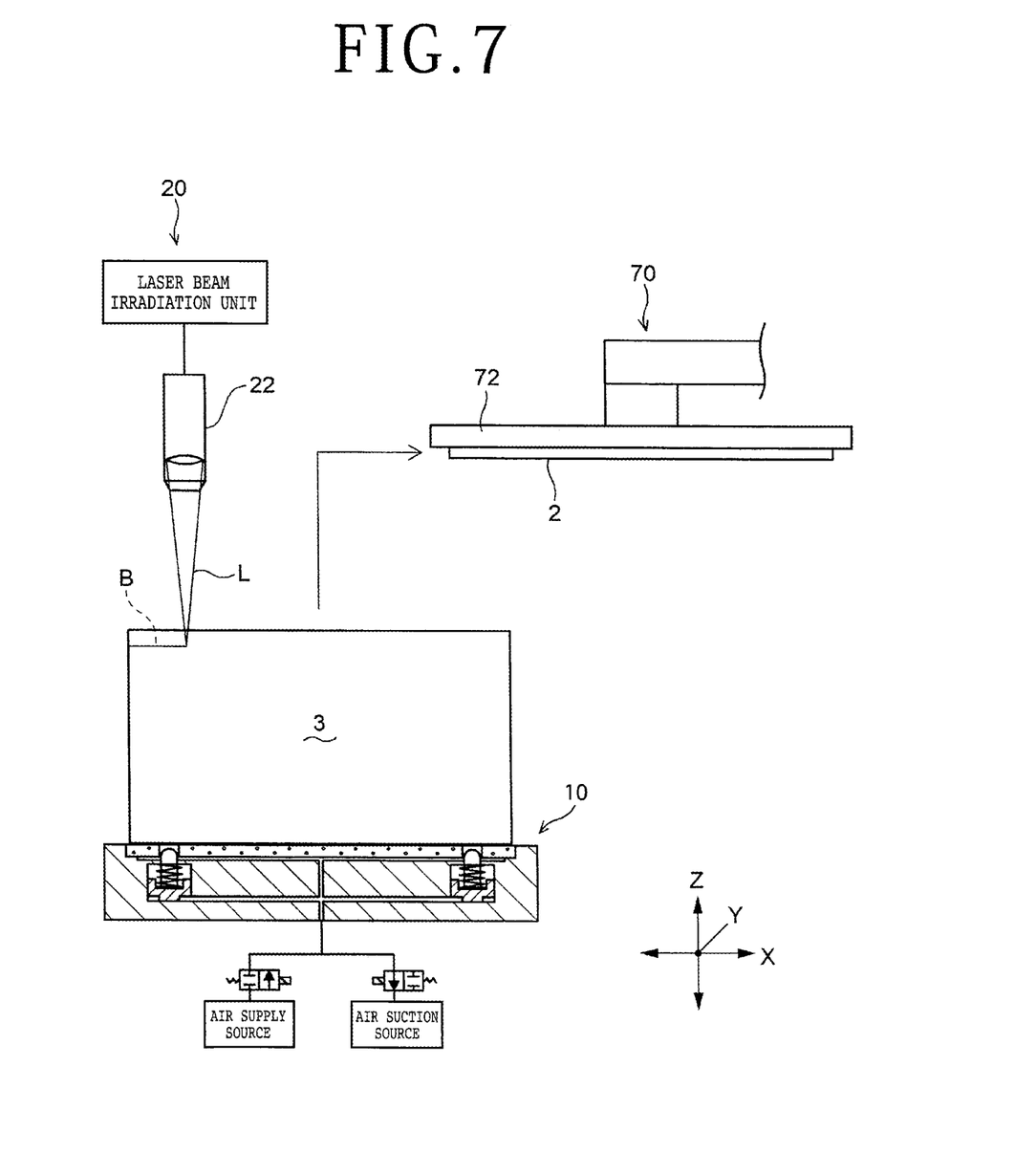
FIG. 7 is a partly sectional side view depicting a laser irradiation step.

Next, as depicted in FIG. 7, a laser beam L is concentrated on a predetermined height position in the ingot 3, and the holding table 40 is horizontally moved in the X-axis and Y-axis directions relative to the laser beam L. By this operation, a separating layer B is formed at the predetermined height position in the ingot 3.

<Separating Step>

Subsequently, as depicted in FIG. 7, the part on the upper side of the separating layer B is separated as a wafer 2 by a separating apparatus 70 having a suction holding pad 72, and the separated wafer 2 is conveyed out. An upper surface of the ingot 3 left by separation of the wafer 2 is flattened by grinding and polishing. Note that this flattening may be conducted on the holding table 40 holding thereon the ingot 3, or may be conducted by releasing the holding and sucking operation on the holding table 40 and conveying the ingot 3 to another grinding apparatus or the like. After the flattening, irradiation with the laser beam L is again performed to form the separating layer B.

The formation of the separating layer B, the separation of the wafer 2, and the flattening of the upper surface of the ingot 3 are repeated until the thickness of the ingot 3 reaches a predetermined thickness. After the thickness of the ingot 3 reaches the predetermined thickness, the control valve 53 is opened to supply air from the air supply source 54 onto the holding surface 42 and into the air pressure chambers 41$k$, whereby a positive pressure is generated on the holding surface 42, and the support pins 44 are moved upward to peel off the remaining part of the ingot 3 from the holding surface 42.

In this way, the present invention can be carried out. In other words, when the ingot 3 is conveyed in, before the ingot 3 is held on the holding surface 42, the ingot 3 is mounted on the tip ends of the plurality of support pins 44 projecting from the holding surface 42 and supported by the support pins 44 above the holding surface 42. Then, the tip ends of the support pins 44 are gradually positioned at retracted positions in which the tip ends of the support pins 44 are buried in the holding surface 42, so that the ingot 3 is held on the holding surface 42. As a result, in the process leading to holding of the ingot 3 by the holding table 40, damage to the holding surface 42 of the holding table 40 by the ingot 3 can be prevented.

The present invention is not limited by the details of the above described preferred embodiment. The scope of the invention is defined by the appended claims and all changes and modifications as fall within the equivalence of the scope of the claims are therefore to be embraced by the invention.

What is claimed is:

1. A holding table assembly comprising:
    a base that has three or more cylinder sections spaced apart at regular intervals in a circumferential direction, a circular recess formed at an upper part thereof, and a flow channel communicating with the cylinder sections and the circular recess;
    a holding table that includes a holding surface for holding under suction an ingot, the holding surface being inserted into the circular recess of the base, and a circular plate having a plurality of minute holes and insertion holes formed at positions corresponding to the cylinder sections and spaced apart at regular intervals in the circumferential direction, the number of the insertion holes being equal to the number of the cylinder sections;
    pistons inserted in the cylinder sections, the number of the pistons being equal to the number of the cylinder sections;
    support pins of which base ends abut against the pistons and tip ends are inserted in the insertion holes, the number of the support pins being equal to the number of the cylinder sections;
    an air suction source;
    an air supply source; and
    a control valve that selectively connects the air suction source and the air supply source to the flow channel,
    wherein when the flow channel is connected to the air supply source through the control valve, and air is supplied into air pressure chambers defined inside the cylinder sections by the pistons inserted into the cylinder sections, thereby causing the tip ends of the support pins to be positioned at supportable positions projecting from the holding surface in such a manner that the ingot can be supported by the tip ends of the support pins, and
    when the flow channel is connected to the air suction source through the control valve to decompress the air pressure chambers, causing the tip ends of the support pins to be positioned at retracted positions in which the tip ends of the support pins are buried in the insertion holes and causing the ingot to be supported on the holding surface and to be held under suction on the holding surface by a negative pressure acting on the plurality of minute holes.

2. The holding table assembly according to claim 1, further comprising:
    an elastic member that is inserted in each cylinder section and biases the support pin in a direction to move the support pin to the retracted position,
    wherein the support pin is positioned at the retracted position when the supply of air into the air pressure chamber is interrupted.

* * * * *